(12) United States Patent
Odry

(10) Patent No.: US 7,548,642 B2
(45) Date of Patent: Jun. 16, 2009

(54) SYSTEM AND METHOD FOR DETECTION OF GROUND GLASS OBJECTS AND NODULES

(75) Inventor: Benjamin L. Odry, West New York, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 693 days.

(21) Appl. No.: 11/255,826

(22) Filed: Oct. 21, 2005

(65) Prior Publication Data

US 2006/0093216 A1    May 4, 2006

Related U.S. Application Data

(60) Provisional application No. 60/623,054, filed on Oct. 28, 2004.

(51) Int. Cl.
*G06K 9/00* (2006.01)

(52) U.S. Cl. .................. 382/141; 382/128; 382/131; 382/274

(58) Field of Classification Search ............... 382/128, 382/131, 141, 274
See application file for complete search history.

(56) References Cited

U.S. PATENT DOCUMENTS

| | | | | |
|---|---|---|---|---|
| 5,602,375 A | * | 2/1997 | Sunahara et al. | 235/384 |
| 5,987,346 A | * | 11/1999 | Benaron et al. | 600/407 |
| 6,275,718 B1 | * | 8/2001 | Lempert | 600/407 |
| 6,299,310 B1 | * | 10/2001 | Reis | 351/214 |
| 6,369,378 B1 | * | 4/2002 | Lamm et al. | 250/227.25 |
| 6,426,776 B1 | * | 7/2002 | Ochi | 348/370 |
| 6,574,490 B2 | * | 6/2003 | Abbink et al. | 600/316 |
| 6,594,518 B1 | * | 7/2003 | Benaron et al. | 600/477 |
| 6,862,091 B2 | * | 3/2005 | Johnson | 356/326 |
| 7,030,969 B2 | * | 4/2006 | Giger | 356/5.02 |

OTHER PUBLICATIONS

Haralick, Robert M. "Statistical and Structural Approaches to Texture," pp. 786-804, Proceedings of IEEE, vol. 67, No. 5, May 1979.

* cited by examiner

*Primary Examiner*—Yosef Kassa

(57) ABSTRACT

A method for detecting ground glass objects in a digitized image comprises the steps of determining intensity statistics from a plurality of ground glass objects, determining an intensity map of the distance of each point in an image from a mean intensity of said ground glass objects wherein one or more candidate ground glass objects can be identified, determining a circularity value for each candidate ground glass object, and calculating one or more feature values wherein said candidate ground glass object is characterized.

25 Claims, 8 Drawing Sheets

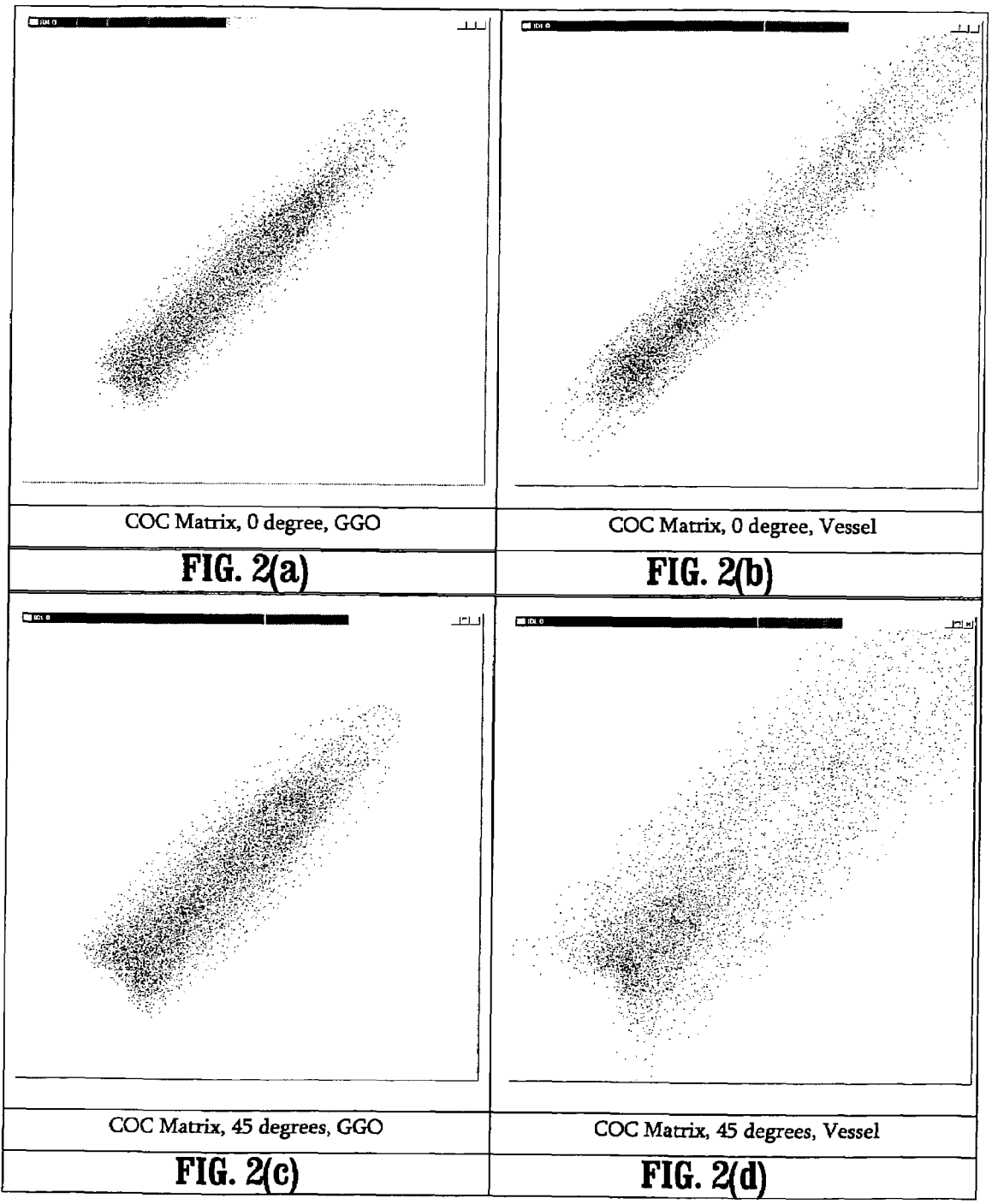

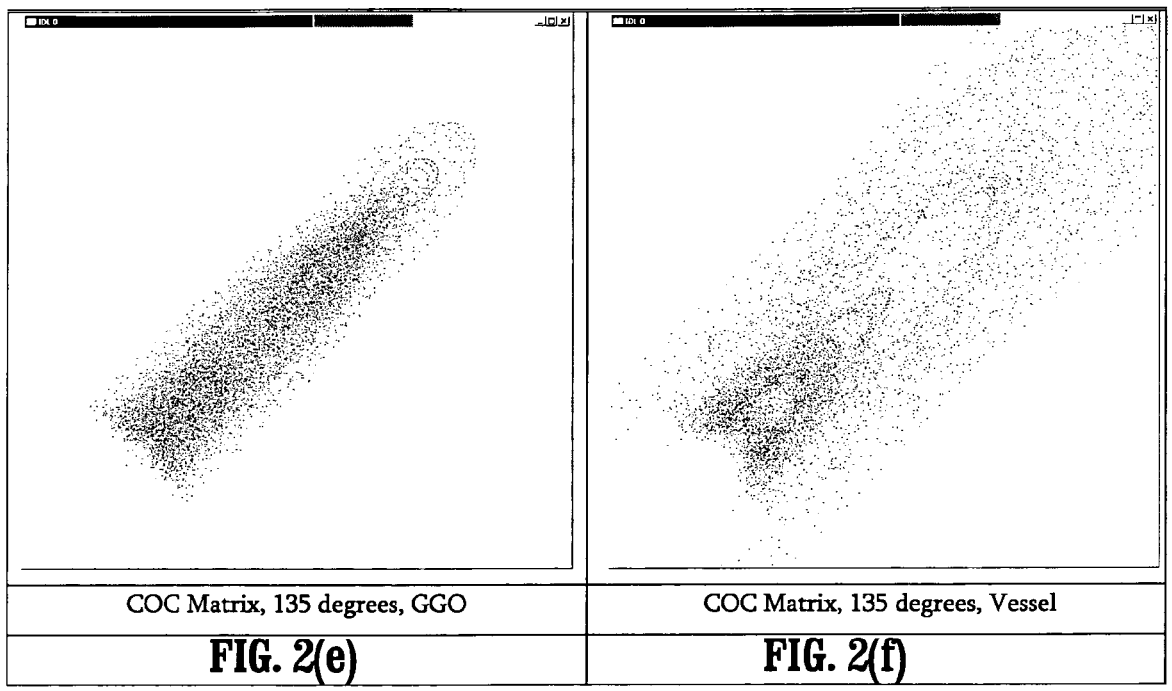

FIG. 3(a): COC Matrix 1, 0 degree

|  | Energy | Entropy | Contrast | Homogeneity |
|---|---|---|---|---|
| Nodule | 16291.8 | -781.441 | 1.47 | 449.943 |
| Vessel | 10176.6 | -230.301 | 1.37 | 238.315 |
|  | Mean | Variance | Skewness | Kurtosis |
| Nodule | 0.0267801 | 0.0335994 | 8.41210 | 89.6544 |
| Vessel | 0.00536508 | 0.00688670 | 27.7104 | 1402.87 |

FIG. 3(b): COC Matrix 2, 45 degrees

|  | Energy | Entropy | Contrast | Homogeneity |
|---|---|---|---|---|
| Nodule | 15393 | -591.660 | 2.81 | 334.93 |
| Vessel | 9322.25 | -140.98 | 3.8 | 114.345 |
|  | Mean | Variance | Skewness | Kurtosis |
| Nodule | 0.0267801 | 0.0317088 | 7.92418 | 79.5287 |
| Vessel | 0.00536509 | 0.00630415 | 22.5927 | 882.736 |

FIG. 3(c): COC Matrix 3, 135 degrees

|  | Energy | Entropy | Contrast | Homogeneity |
|---|---|---|---|---|
| Nodule | 15468.4 | -622.406 | 2.53 | 359.51 |
| Vessel | 9289.4 | -126.52 | 3.36 | 106.57 |
|  | Mean | Variance | Skewness | Kurtosis |
| Nodule | 0.0267801 | 0.0318649 | 7.83585 | 74.3602 |
| Vessel | 0.00536508 | 0.00628167 | 22.7096 | 901.822 |

| (1, 1) | (1, 2) | (1, 3) | (1, 4) |
|---|---|---|---|
| (2, 1) | (2, 2) | (2, 3) | (2, 4) |
| (3, 1) | (3, 2) | (3, 3) | (3, 4) |
| (4, 1) | (4, 2) | (4, 3) | (4, 4) |

$$R_H = \{((k,l),(m,n)) \in ((L_y \times L_x) \times ((L_y \times L_x) | k-m=0, |l-n|=1\}$$
$$= \{((1,1),(1,2)), ((1,2),(1,1)), ((1,2),(1,3)), ((1,3),(1,2)),$$
$$((1,3),(1,4)), ((1,4),(1,3)), ((2,1),(2,2)), ((2,2),(2,1)),$$
$$((2,2),(2,3)), ((2,3),(2,2)), ((2,3),(2,4)), ((2,4),(2,3)),$$

| 0 | 0 | 1 | 1 |
|---|---|---|---|
| 0 | 0 | 1 | 1 |
| 0 | 2 | 2 | 2 |
| 2 | 2 | 3 | 3 |

Grey Tone

|  | | 0 | 1 | 2 | 3 |
|---|---|---|---|---|---|
| | 0 | #(0,0) | #(0,1) | #(0,2) | #(0,3) |
| Grey | 1 | #(1,0) | #(1,1) | #(1,2) | #(1,3) |
| Tone | 2 | #(2,0) | #(2,1) | #(2,2) | #(2,3) |
| | 3 | #(3,0) | #(3,1) | #(3,2) | #(3,3) |

FIG. 6(a)  FIG. 6(b)

$$0° \quad P_H = \begin{pmatrix} 4 & 2 & 1 & 0 \\ 2 & 4 & 0 & 0 \\ 1 & 0 & 6 & 1 \\ 0 & 0 & 1 & 2 \end{pmatrix} \quad 90° \quad P_V = \begin{pmatrix} 6 & 0 & 2 & 0 \\ 0 & 4 & 2 & 0 \\ 2 & 2 & 2 & 2 \\ 0 & 0 & 2 & 0 \end{pmatrix}$$

$$135° \quad P_{LD} = \begin{pmatrix} 2 & 1 & 3 & 0 \\ 1 & 2 & 1 & 0 \\ 3 & 1 & 0 & 2 \\ 0 & 0 & 2 & 0 \end{pmatrix} \quad 45° \quad P_{RD} = \begin{pmatrix} 4 & 1 & 0 & 0 \\ 1 & 2 & 2 & 0 \\ 0 & 2 & 4 & 1 \\ 0 & 0 & 1 & 0 \end{pmatrix}$$

FIG. 6(c)

SYSTEM AND METHOD FOR DETECTION OF GROUND GLASS OBJECTS AND NODULES

CROSS REFERENCE TO RELATED UNITED STATES APPLICATIONS

This application claims priority from "First approach to Ground Glass Nodules detection", U.S. Provisional Application No. 60/623,054 of Benjamin Odry, filed Oct. 28, 2004, the contents of which are incorporated by reference herein.

TECHNICAL FIELD

This invention is directed to the detection of ground glass nodules in digitized medical images.

DISCUSSION OF THE RELATED ART

Computed Tomography (CT) scanners are widely used for lung cancer screening. CT scanners provide high-resolution datasets and potentially allow for precise analysis and improved detection of lung abnormalities. However, analyzing datasets on a slice-by-slice basis is generally time consuming, and automatic detection tools have been proven to be of help to physicians.

Several tools to aid in automated detection of abnormalities, such as interactive nodule segmentation tools or nodule follow-up tools, which typically form part of a Computer Aided Diagnosis (CAD) system, have been implemented. However, some structures remain not well known to physicians, presenting specific characteristics that challenging to define. For example, Ground Glass Nodules (GGN) and Ground Glass Opacities (GGO) are opaque structures in the lungs with an ill-defined shape. A GGN differs from a GGO in that the opacities of GGNs are usually greater in magnitude and they have a more complex shape. These structures have a high potential to be malignant, and many physicians think they could become solid nodules. Accordingly, there is interest for evaluating, characterizing and screening GGOs and GGNs for a better understanding of their evolution.

SUMMARY OF THE INVENTION

Exemplary embodiments of the invention as described herein generally include methods and systems for detecting GGOs, in which GGO features are extracted from CT scans of the lungs and compared to other structures.

According to an aspect of the invention, there is provided a method for detecting ground glass objects in a digitized image, including providing a digitized image comprising a plurality of intensities corresponding to a domain of points on an N-dimensional grid, determining intensity statistics from a plurality of ground glass objects, determining an intensity map of the distance of each point in said image from a mean intensity of said ground glass objects wherein one or more candidate ground glass objects can be identified, determining a circularity value for each candidate ground glass object, and calculating one or more feature values wherein said candidate ground glass object is characterized.

According to a further aspect of the invention, determining an intensity map for each point comprises dividing a range of intensities into intervals, assigning each point in said image to an intensity interval, determining a weighted intensity for each point based on the intensities of its nearest neighbors, and calculating a function of the difference of each point intensity and the mean ground glass object intensity, wherein a contiguous collection of points are identified as being part of a candidate ground glass object.

According to a further aspect of the invention, the function is $y = \kappa \cdot e^{-[\mu - \bar{v}/\sigma]_2}$, where $\bar{v}$ is the weighted neighborhood intensity of the current point, $k$ an arbitrary normalization constant, and $\mu$ and $\sigma$ are, respectively, the mean intensity value and standard deviation of the ground glass objects.

According to a further aspect of the invention, the weighted intensity for each point is calculated from the formula (Sum (neighborhood point intensities)+w % (point intensity))/(9+w), where w is a predetermined weighting factor.

According to a further aspect of the invention, determining a circularity value comprises smoothing said candidate ground glass object based on mathematical morphology, and computing a ratio of the surface area of the candidate object to the area of a circle of a same radius.

According to a further aspect of the invention, the method comprises growing a region for each said candidate ground glass object and computing a gray-level co-occurrence matrix of each region.

According to a further aspect of the invention, growing a region further comprises determining a seed point for each candidate object, determining a distance map of each point in the candidate ground glass object to the background, applying a threshold to the distance map wherein points whose distance map exceeds the threshold are excluded from said region, and dilating said region.

According to a further aspect of the invention, the N-dimensional grid is a 2D rectangular lattice, and said co-occurrence matrix is calculated for point pairs at angular orientations of 0°, 45°, 90°, and 135°.

According to a further aspect of the invention, the co-occurrence matrix frequencies are sets defined by:

$$P(i, j, d, 0°) = \#\begin{cases} ((k, l), (m, n)) \in (L_r \times L_c) \mid \\ k - m = 0, |l - n| = 0, I(k, l) = i, I(m, n) = j \end{cases},$$

$$P(i, j, d, 45°) = \#\begin{cases} ((k, l), (m, n)) \in (L_r \times L_c) \mid \\ (k - m = d, l - n = -d) \text{ or } (k - m = -d, l - n = d), I(k, l) = i, I(m, n) = j \end{cases},$$

$$P(i, j, d, 90°) = \#\begin{cases} ((k, l), (m, n)) \in (L_r - L_c) \mid \\ |k - m| = d, l - n = 0, I(k, l) = i, I(m, n) = j \end{cases},$$

$$P(i, j, d, 135°) = \#\begin{cases} ((k, l), (m, n)) \in (L_r \times L_c) \mid \\ (k - m = d, l - n = d) \text{ or } (k - m = -d, l - n = -d), I(k, l) = i, I(m, n) = j \end{cases},$$

where d is a distance between point pairs, $L_c$ is the horizontal spatial domain, $L_r$ is the vertical spatial domain, and I is an intensity function defined on point pairs in the image domain set $L_r \% L_c$.

According to a further aspect of the invention, the distance d is two points apart.

According to a further aspect of the invention, the features comprise the mean, variance, skewness, kurtosis, energy, entropy, homogeneity, and contrast.

According to another aspect of the invention, there is provided a program storage device readable by a computer, tangibly embodying a program of instructions executable by the computer to perform the method steps for detecting ground glass objects in a digitized image.

BRIEF DESCRIPTION OF THE DRAWINGS

FIGS. 2(a)-(f) illustrates a comparison of COC matrices of a GGO and a vessel, according to an embodiment of the invention.

FIGS. 3(a)-(c) is a table of feature comparisons between a GGO and a vessel, as computed from the COC matrices of FIG. 2, according to an embodiment of the invention.

FIGS. 5(a)-(b) depict an exemplary 4%4 image, and the set of all horizontal neighboring pixels separated by a distance of 1, according to an embodiment of the invention.

FIGS. 6(a)-(c) depict, respectively, an exemplary 4%4 image, the general form of any gray tone spatial dependence matrix, and the 4 gray level co-occurrence matrices for a distance d=1 along the horizontal direction, according to an embodiment of the invention.

DETAILED DESCRIPTION OF THE PREFERRED EMBODIMENTS

Exemplary embodiments of the invention as described herein generally include systems and methods for detecting GGOs, in which GGOs features are extracted from CT scans of the lungs and compared to other structures. Using a whole CT volume, one or more structures are pre-selected that could be identified as GGOs. Such identification is based upon information such as shape and density. In addition, structural and statistical features are identified that can be used to characterize GGOs. Detection processes for GGNs are essentially the same as for GGOs, with a few differences in the initial assumptions to accommodate their differences. Although exemplary embodiments of the invention will be described herein below in terms of GGOs for expository purposes, it is to be understood that one skilled in the art can apply methods according to an embodiment of the invention for the detection of GGNs.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g. a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 4:
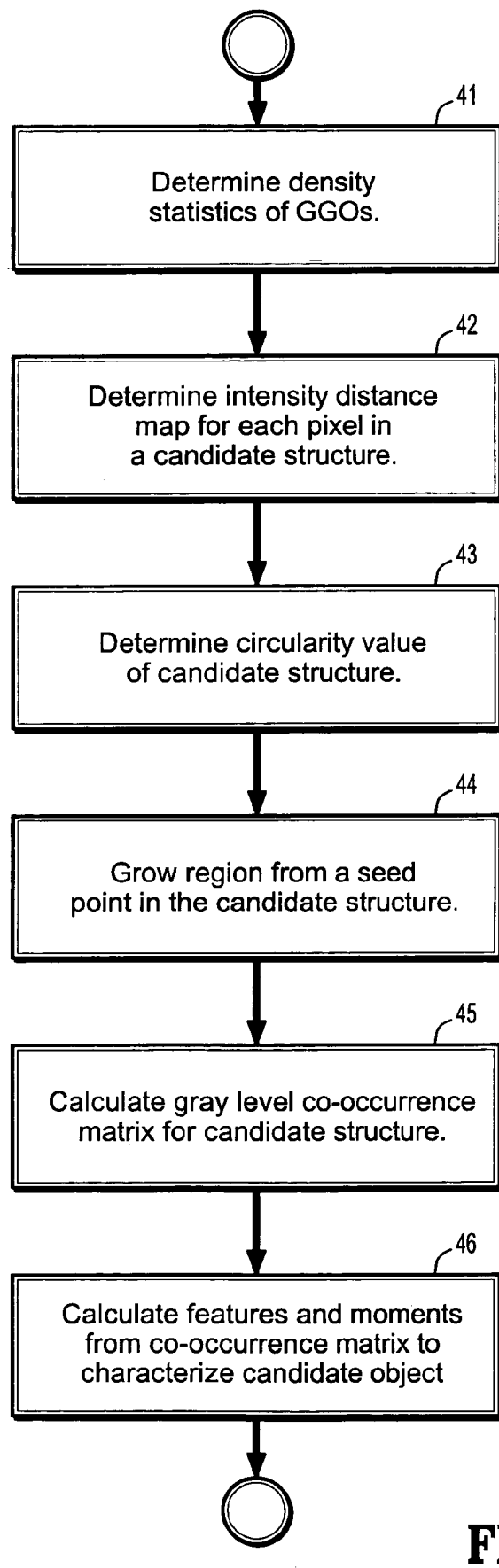
FIG. 4 depicts a flow chart of a GGO detector, according to an embodiment of the invention.

A flow chart of a detection method according to an embodiment of the invention is depicted in FIG. 4. A first step for generating a candidate is determining at step 41 a density range of the GGOs. An exemplary image formed from currently available imaging modalities has a 12-bit intensity word size, for an intensity range of 0 to 4095 grayscale units. An initial measurement of the density of 23 GGOs gives a mean of 349.5 grayscale units with a standard deviation of 150. GGOs are less dense, i.e. their average intensity is lower, than solid nodules, and GGO density typically varies between 200 and 600 grayscale units. In some cases, a GGO can include solid structures, which would increase the average density. The mean and standard deviation values presented above are for expository purposes, and would be different for imaging modalities with differing intensity word sizes. It is to be understood that density measurements formed from other imaging modalities with differing word sizes is within the scope of an embodiment of the invention.

According to one exemplary embodiment of the invention, candidate generation is implemented to work on 2D slices. A map of the distance of each pixel from the mean intensity value is created at step 42 as follows. The density domain is divided into intensity intervals that are 50 grayscale units wide, above and below the mean value, with a lower limit of 200 grayscale units. Each pixel i can be assigned a classification into one of these intensity intervals according to the formula class(i)=$|I_i-\mu|/50$, where I is an intensity in the $j^{th}$ interval, and $\mu$ is the previously computed GGO mean intensity. Each intensity interval is associated with a score a related to its closeness to the GGO mean. The farther from the mean, the lower this score is. In addition, each pixel of a candidate structure is assigned a score v corresponding to a weighted intensity average of its 8-neighbors' score, where an additional weighting factor w is applied to the central pixel of a 9 pixel neighborhood:

v=(Sum(neighborhood intensities)+w % (center pixel intensity))/(9+w).

In addition, a function of the previously computed GGO average and variance can be defined as $$y = \kappa \cdot e^{-(\frac{\mu-v}{\sigma})^2},$$

where v is the weighted neighborhood intensity of the current pixel, k an arbitrary normalization constant, and $\mu$ and $\sigma$ the previously computed parameters. This Gaussian function emphasizes the GGO-like structure, and becomes negligibly small for intensity values above 600 grayscale intensity units. The Gaussian function of the pixel intensity serves as a coefficient applied to the intensity interval score a.

This first computed score concerns only the density. A second computed score concerns the shape. The basic shape of a GGO is round, although some cases have irregular contours and/or more or less elongated shape. Based on the intensity interval scores, a contiguous collection of pixels can be identified that make up the candidate GGO. After a mathematical morphology based smoothing of the structure to avoid irregularities, the shape of the structure is analyzed and compared to a circle shape. A circularity value is computed at step 43, and determines whether or not the structure should be considered to be a GGO. One exemplary, non-limiting technique for calculating circularity is to compute, the ratio of the surface area of the structure to the area of a circle of the same radius. Another circularity measure known in the art includes computing the compactness of the candidate object. This helps avoid the selection of low-intensity vessels, structures that are highly non-circular, as candidates. Thus, based on density and shape, a candidate is selected.

Figure 1A:
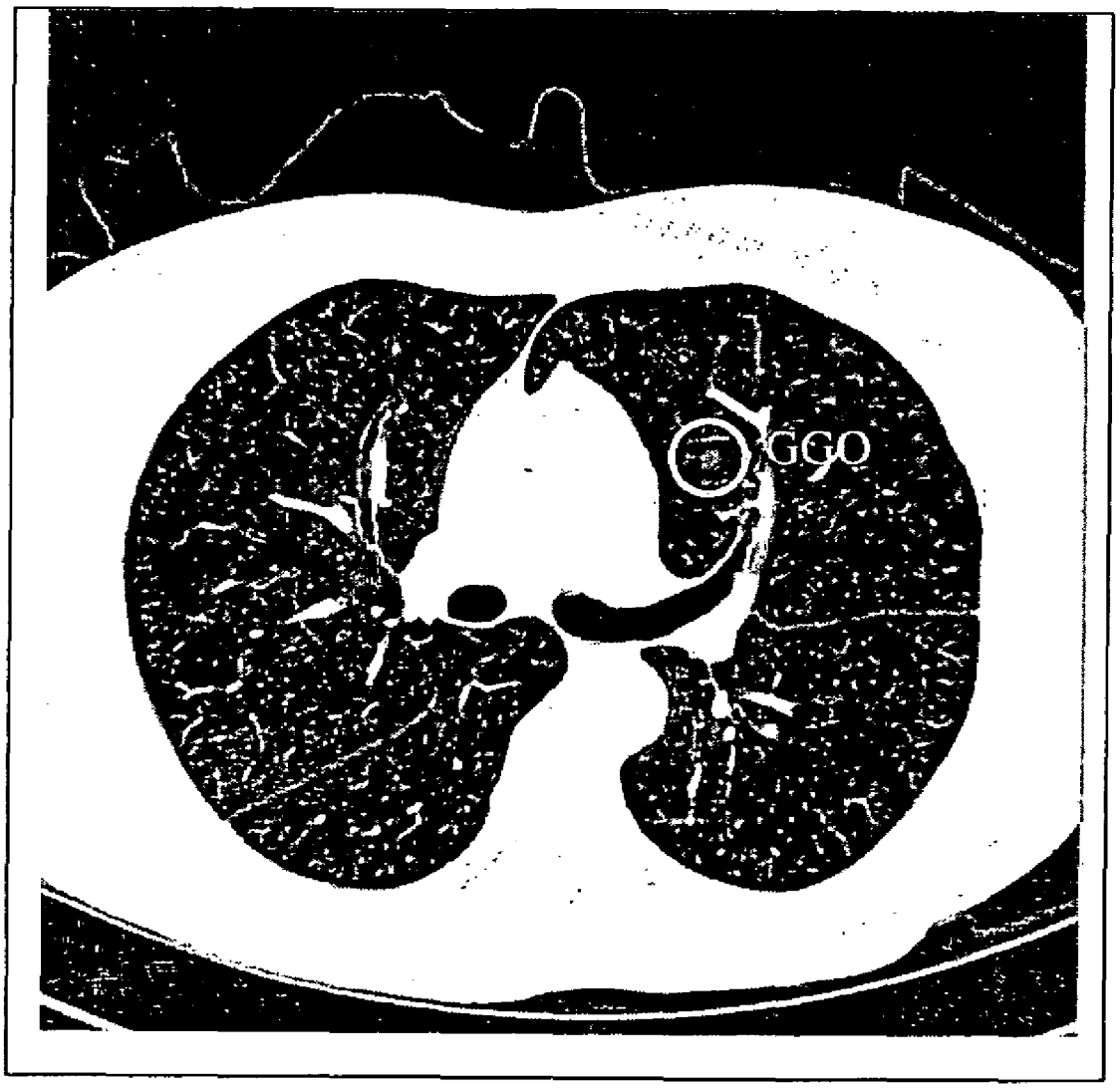
FIGS. 1(a)-(b) depict the result of candidate generation, according to an embodiment of the invention.
Figure 1B:
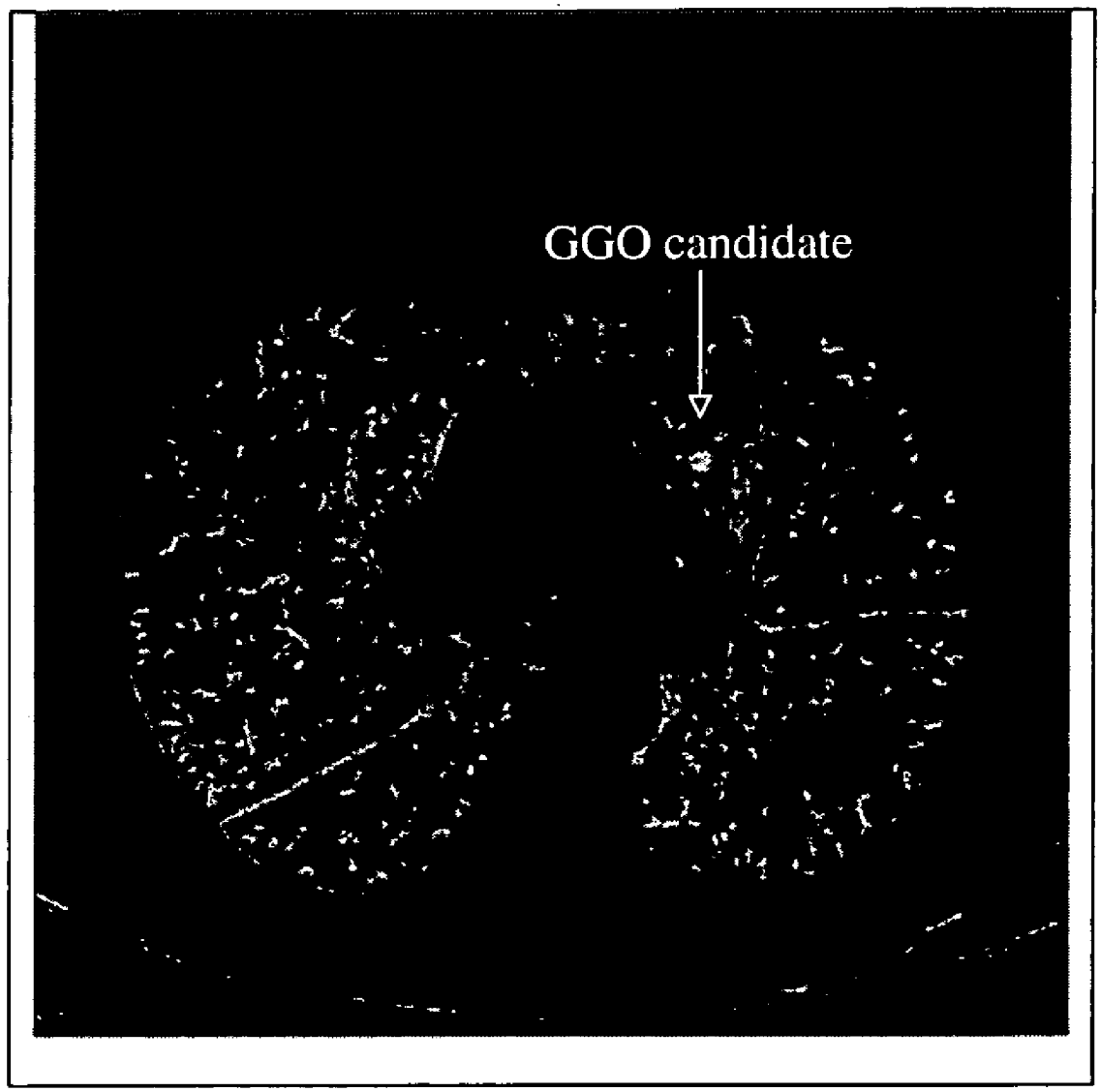

FIGS. 1(*a*)-(*b*) depict the result of candidate generation, according to an embodiment of the invention. FIG. 1(*a*) depicts the original image, where a GGO is circled. FIG. 1(*b*) depicts a selection map, where the bright spots indicate a candidate GGO.

According to an embodiment of the invention, the extraction of structural features occurs after candidate generation and ensures that the candidate is indeed a GGO. An exemplary, non-limiting embodiment has been implemented in a 2-dimensional space, using texture analysis methods for finding statistical and structural features for characterization.

Once a candidate structure has been identified, a reference point is defined, for example, by averaging the surface points of the candidate. Referring again to FIG. 4, at step 44, a region-growing procedure that starts from the reference point defines the structure to analyze. In one exemplary region growing procedure, a distance map is defined for the structure, where the map value for each pixel of the structure represents the distance of that pixel to the background. A threshold is applied to the distance map to prevent the attachment of small structures. The region is then dilated to complete the smoothing. This region growing procedure is non-limiting, and other regions growing procedures as are known in the art are within the scope of an embodiment of the invention.

To extract features, a gray level co-occurrence matrix (COC matrix) is created at step 45. The COC matrix relates spatial distribution with spatial dependence among the gray tones, and is similar to an intensity histogram, with the additional constraint of finding a second intensity value at a defined location. The constraints applied to the COC matrix computation can differentiate a compact structure from a vessel.

A gray level co-occurrence matrix can be computed as follows. Suppose the image area to be analyzed is rectangular, with $N_c$ pixels in the horizontal direction, and $N_r$ pixels in the vertical direction, and with $N_g$ levels of gray tones. Let $L_c = \{1, 2, \ldots, N_c\}$ be horizontal spatial domain, $L_r = \{1, 2, \ldots, N_r\}$ be the vertical spatial domain, and $G = \{1, 2, \ldots, N_g\}$ be the set of $N_g$ quantized gray tones. The set $L_r \% L_c$ is the set of image domain pixels ordered by their row-column designations. The image can be represented by an intensity function I which assigns a gray tone in G to each pixel or pair of coordinates in $L_r \% L_c$, where $I: L_r \% L_c \tau G$. The gray tone co-occurrence can be defined as a matrix of relative frequencies $P_{ij}$ in which two neighboring resolution cells separated by a distance d occur in the image, one with gray tone i and the other with gray tone j. A matrix of spatial gray tone frequencies is symmetric and is a function of the distance between cell pairs as well as their angular dependence.

FIG. 5(*a*) depicts an exemplary 4%4 image, showing the row and column indices for each image pixel, and FIG. 5(*b*) depicts the set of all horizontal neighboring pixels separated by a distance of 1. This set, along with the gray tones for each pixel, would be used to calculate a distance 1 horizontal (0°) gray tone dependence matrix.

Formally, for angles quantized to 45° intervals, the co-occurrence matrix frequencies for a distance d can be defined by:

$$P(i, j, d, 0°) = \#\left\{\begin{array}{l}((k, l), (m, n)) \in (L_r \times L_c) \mid \\ k - m = 0, |l - n| = 0, I(k, l) = i, I(m, n) = j\end{array}\right\},$$

$$P(i, j, d, 45°) = \#\left\{\begin{array}{l}((k, l), (m, n)) \in (L_r \times L_c) \mid \\ (k - m = d, \ln = -d) \text{ or } (k - m = -d, l - n = d), I(k, l) = i, I(m, n) = j\end{array}\right\},$$

$$P(i, j, d, 90°) = \#\left\{\begin{array}{l}((k, l), (m, n)) \in (L_r - L_c) \mid \\ |k - m| = d, l - n = 0, I(k, l) = i, I(m, n) = j\end{array}\right\},$$

$$P(i, j, d, 135°) = \#\left\{\begin{array}{l}((k, l), (m, n)) \in (L_r \times L_c) \mid \\ (k - m = d, l - n = d) \text{ or } (k - m = -d, l - n = -d), I(k, l) = i, I(m, n) = j\end{array}\right\},$$

where # indicates the number of elements in the set.

An exemplary 4% 4 image, with 4 gray tones ranging from 0 to 3, is depicted in FIG. 6(*a*). FIG. 6(*b*) illustrates the general form of any gray tone spatial dependence matrix. The rows and columns of this matrix are indexed by the gray tone level, with each element (k, l) being the number of pixel pairs, separated by a distance d at some specified angular separation, where one pixel has gray level k and the other pixel has gray level l. FIG. 6(*c*) illustrates the 4 gray level co-occurrence matrices for a distance d=1 along the horizontal direction, for the matrix illustrated in FIG. 6(*a*). The 4 matrices are the horizontal direction (0°), the vertical direction (90°), the left diagonal direction (135°), and the right diagonal direction (45°).

Thus, the COC matrix then represents the inter-dependence of pixels inside the GGOs, based on the angulation as well as the distance. For an image with pixels forming a 4-connected, rectangular grid, one is interested in four angles: 0, 45, 90 and 135 degrees.

Features can characterize the COC matrices and help distinguish GGOs from other structures. Features than can be computed from the COC matrix include energy, entropy, homogeneity and contrast. Moments of the matrices can also be used for differentiation. A measure can be defined as a function $m(d,\Theta)$ of distance d and angle $\Theta$ extracted from a COC matrix $S(i,j,d,\Theta)$ for intensity levels i,j. Features and moments that can be used for COC matrix analysis are defined as follows.

Mean:

$$\mu(d, \Theta) = \sum_{i=0}^{N_g-1} \sum_{j=0}^{N_g-1} S(i, j, d, \Theta)$$

-continued

Variance:
$$\sigma^2(d, \Theta) = \sum_{i=0}^{N_g-1} \sum_{j=0}^{N_g-1} [S(i, j, d, \Theta) - \mu(d, \Theta)]^2$$

Skewness:
$$\gamma(d, \Theta) = \sum_{i=0}^{N_g-1} \sum_{j=0}^{N_g-1} \left( \frac{S(i, j, d, \Theta) - \mu(d, \Theta)}{\sigma(d, \Theta)} \right)^3$$

Kurtosis:
$$\beta(d, \Theta) = \sum_{i=0}^{N_g-1} \sum_{j=0}^{N_g-1} \left( \frac{S(i, j, d, \Theta) - \mu(d, \Theta)}{\sigma(d, \Theta)} \right)^4 - 3$$

Energy:
$$E(d, \Theta) = \sum_{i=0}^{N_g-1} \sum_{j=0}^{N_g-1} [S(i, j, d, \Theta)]^2$$

Entropy:
$$H(d, \Theta) = -\sum_{i=0}^{N_g-1} \sum_{j=0}^{N_g-1} S(i, j, d, \Theta) \ln [S(i, j, d, \Theta)]$$

Homogeneity:
$$I(d, \Theta) = \sum_{\substack{i=0 \\ i \neq j}}^{N_g-1} \sum_{j=0}^{N_g-1} \frac{1}{(i-j)^2} S(i, j, d, \Theta)$$

Contrast:
$$C(d, \Theta) = \sum_{i=0}^{N_g-1} \sum_{j=0}^{N_g-1} (i-j)^2 S(i, j, d, \Theta)$$

Note that contrast and the homogeneity measures measure dual properties, in that contrast has larger values for images with more contrast in the texture patterns, while homogeneity is larger for patterns with less contrast. The preceding list of features and moments is exemplary and non-limiting, and other features- and moments can be used to characterize an object as a GGO as be within the scope of an embodiment of the invention.

These parameters are related to the structure being studied in an image, and can discriminate a GGO from a vessel using the angulation. Judicious choice of the distance parameter can improve the accuracy of the matrices.

FIGS. 2(a)-(f) illustrates a comparison of COC matrices of a GGO and a vessel, along three angles (0, 45, and 135 degrees), at a distance of 2 pixels, according to an embodiment of the invention. The top row of the figure, FIGS. 2(a)-(b), illustrates the COC matrices calculated at 0 degrees for a GGO and a vessel, the middle row of the figure, FIGS. 2(c)-(d), illustrates the COC matrices calculated at 45 degrees for a GGO and a vessel, while the bottom row of the figure, FIGS. 2(e)-(f), illustrates the matrices calculated at 135 degrees for a GGO and a vessel. This GGO does not have an intensity peaks that could correlate to a solid state. The COC matrices are represented in an 800% 800 pixels window, one pixel representing one grayscale in both X and Y directions. In each of the figure panels, the dots representing matrix values get darker as one moves from the lower left to the upper right. The darker the pixel is, the more points satisfy the constraints of intensity and position in the COC matrix computation.

The low density of the GGOs creates a dense image on the COC matrix, between 200 and 600 grayscale units. The dispersion of the points around the "y=x" line/axis shows that the GGO density is concentrated around those low intensity values. Note that the COC matrices of the vessels show that points are sparser than the GGOs, which is indicative of both greater intensities and greater variations of the intensities of the vessels. In addition, note the darkness of the 0-degree COC matrix of the vessel. This is because this vessel has a horizontal position.

Referring back to FIG. 4, at step 46, the above identified features and moments are computed for the candidate structure. FIGS. 3(a)-(c) are tables that illustrate initial results of the feature computation comparing this GGO and vessel. Features are computed from COC matrices in FIG. 2. The top row of the figure, FIG. 3(a), displays the feature results computed from a first COC matrix calculated for pixel pairs at a 0° orientation. The middle row of the figure, FIG. 3(b), displays the feature results computed from a second COC matrix calculated for pixel pairs at a 45° orientation. The bottom row of the figure, FIG. 3(c), displays the feature results computed from a third COC matrix calculated for pixel pairs at a 135° orientation. The results indicate that feature "contrast" has too little difference between the two structures to be relevant. However, the other three features associated with the moments of the COC matrices show enough differences to be used efficiently, and these differences are consistent across each of the three matrices displayed. In particular, the energy for a GGO is about 1.5 times that for a vessel, the entropy magnitude for a GGO is about 3-5 times the magnitude of that for a vessel, the homogeneity for a GGO is about 2-3 time that for a vessel, the mean and variance values for a GGO are about 5 times that for a vessel, skewness for a GGO is about one-third that for a vessel, and the kurtosis of a GGO is about 12-15 times that for a vessel. Note that the values for the mean and variance are much lower than the GGO gray level mean and variance disclosed above, which is due to the inclusion of background value pixels in the COC matrix calculations.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 7:
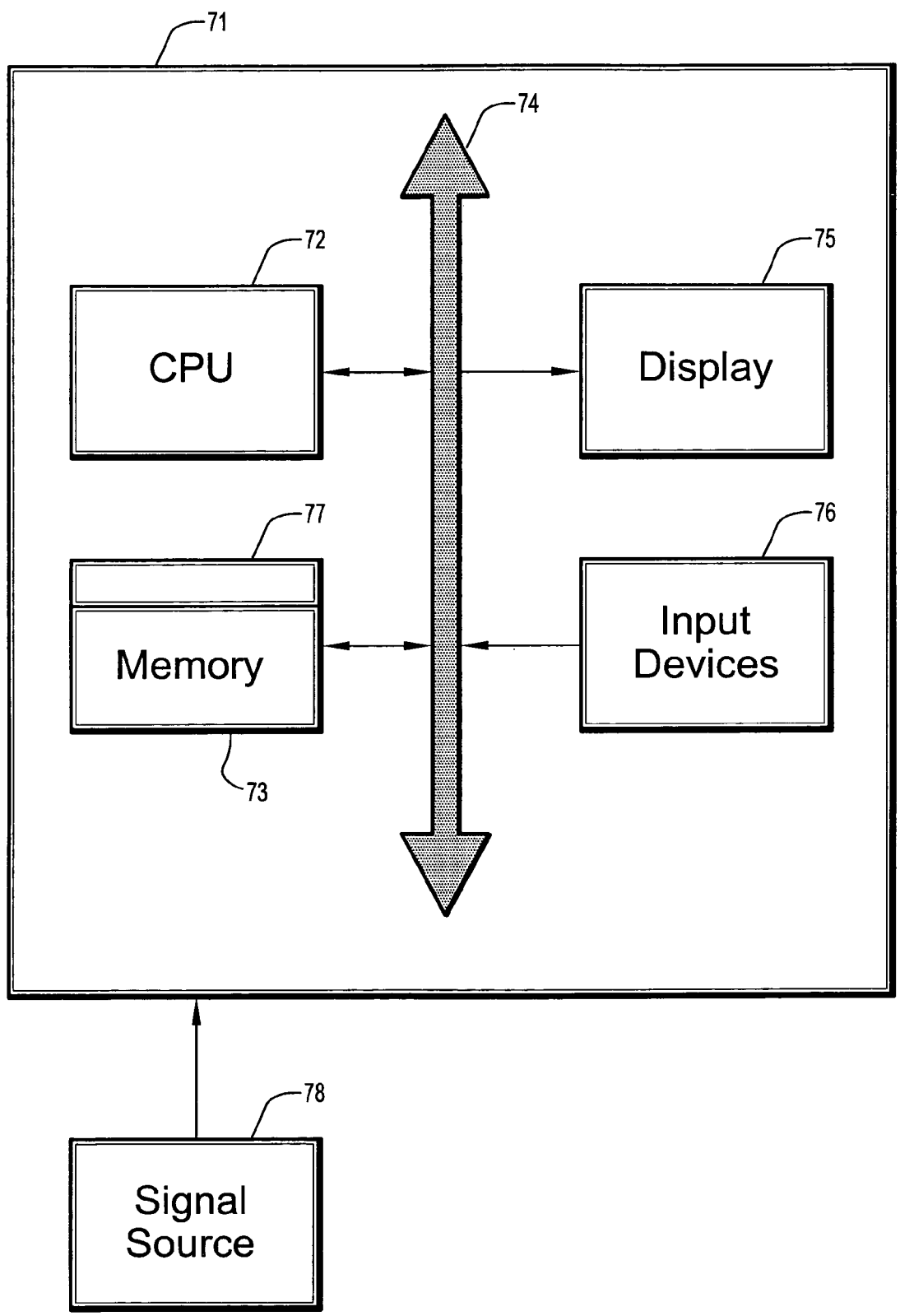
FIG. 7 is a block diagram of an exemplary computer system for implementing a GGO detector, according to an embodiment of the invention.

FIG. 7 is a block diagram of an exemplary computer system for implementing a GGO detector, according to an embodiment of the invention. Referring now to FIG. 7, a computer system 71 for implementing the present invention can comprise, inter alia, a central processing unit (CPU) 72, a memory 73 and an input/output (I/O) interface 74. The computer system 71 is generally coupled through the I/O interface 74 to a display 75 and various input devices 76 such as a mouse and a keyboard. The support circuits can include circuits such as cache, power supplies, clock circuits, and a communication bus. The memory 73 can include random access memory (RAM), read only memory (ROM), disk drive, tape drive, etc., or a combinations thereof. The present invention can be implemented as a routine 77 that is stored in memory 73 and executed by the CPU 72 to process the signal from the signal source 78. As such, the computer system 71 is a general purpose computer system that becomes a specific purpose computer system when executing the routine 77 of the present invention.

The computer system 71 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for detecting ground glass objects in a digitized medical image comprising the steps of:
providing a digitized medical image comprising a plurality of intensities corresponding to a domain of points on an N-dimensional grid;
determining intensity statistics from a plurality of ground glass objects;
determining an intensity map of the distance of each point in said image from a mean intensity of said ground glass objects wherein one or more candidate ground glass objects can be identified;
determining a circularity value for each candidate ground glass object; and
calculating one or more feature values wherein said candidate ground glass object is characterized, wherein said circularity value and features values are adapted to distinguishing an actual ground glass object from a candidate ground glass object.

2. The method of claim 1, wherein determining an intensity map for each point comprises:
dividing a range of intensities into intervals;
assigning each point in said image to an intensity interval;
determining a weighted intensity for each point based on the intensities of its nearest neighbors; and
calculating a function of the difference of each point intensity and the mean ground glass object intensity, wherein a contiguous collection of points are identified as being part of a candidate ground glass object.

3. The method of claim 2, wherein said function is $$y = \kappa \cdot e^{-\left(\frac{\mu - \nu}{\sigma}\right)^2},$$

where $\nu$ is the weighted neighborhood intensity of the current point, k an arbitrary normalization constant, and $\mu$ and $\sigma$ are, respectively, the mean intensity value and standard deviation of the ground glass objects.

4. The method of claim 2, wherein the weighted intensity for each point is calculated from the formula (Sum(neighborhood point intensities)+w %(point intensity))/(9+w), where w is a predetermined weighting factor.

5. The method of claim 1, wherein determining a circularity value comprises smoothing said candidate ground glass object based on mathematical morphology and computing a ratio of the surface area of the candidate object to the area of a circle of a same radius.

6. The method of claim 1, further comprising growing a region for each said candidate ground glass object and computing a gray-level co-occurrence matrix of each region.

7. The method of claim 6, wherein growing a region further comprises determining a seed point for each candidate object, determining a distance map of each point in the candidate ground glass object to the background, applying a threshold to the distance map wherein points whose distance map exceeds the threshold are excluded from said region, and dilating said region.

8. The method of claim 6, wherein the N-dimensional grid is a 2D rectangular lattice, and said co-occurrence matrix is calculated for point pairs at angular orientations of 0°, 45°, 90°, and 135°.

9. The method of claim 8, wherein said co-occurrence matrix frequencies are sets defined by:

$$P(i, j, d, 0°) = \#\left\{\begin{array}{l}((k, l), (m, n)) \in (L_r \times L_c) \mid \\ k - m = 0, |l - n| = 0, I(k, l) = i, I(m, n) = j\end{array}\right\},$$

$$P(i, j, d, 45°) = \#\left\{\begin{array}{l}((k, l), (m, n)) \in (L_r \times L_c) \mid \\ (k - m = d, l n = -d) \text{ or } (k - m = -d, l - n = d), I(k, l) = i, I(m, n) = j\end{array}\right\},$$

$$P(i, j, d, 90°) = \#\left\{\begin{array}{l}((k, l), (m, n)) \in (L_r - L_c) \mid \\ |k - m| = d, l - n = 0, I(k, l) = i, I(m, n) = j\end{array}\right\},$$

$$P(i, j, d, 135°) = \#\left\{\begin{array}{l}((k, l), (m, n)) \in (L_r \times L_c) \mid \\ (k - m = d, l - n = d) \text{ or } (k - m = -d, l - n = -d), I(k, l) = i, I(m, n) = j\end{array}\right\},$$

where d is a distance between point pairs, $L_c$ is the horizontal spatial domain, $L_r$ is the vertical spatial domain, and I is an intensity function defined on point pairs in the image domain set $L_r \% L_c$.

10. The method of claim 9, wherein the distance d is two points apart.

11. The method of claim 1, wherein said features comprise the mean, variance, skewness, kurtosis, energy, entropy, homogeneity, and contrast.

12. A method for a computer processor to detect ground glass objects in a digitized medical image, said method comprising the steps of:
determining an intensity map of the distance of each pixel in the medical image from a mean intensity of said ground glass objects wherein one or more contiguous collections of points are identified as candidate ground glass objects;
determining a circularity value for each candidate ground glass object;
calculating one or more intensity level co-occurrence matrices for each candidate object, wherein each co-occurrence matrix is calculated for pixel pairs at a predetermined pixel pair separation distance and angular orientation; and calculating one or more feature values from said co-occurrence matrices.

13. The method of claim 12, further comprising analyzing one or more digitized images to determine a mean ground glass object intensity value and a standard deviation.

14. The method of claim 12, wherein said digitized image comprises a plurality of intensities corresponding to a domain of points on an 2-dimensional rectangular grid, said predetermined angles are 0°, 45°, 90°, and 135°, and said pixel pair separation distance is 2 pixels.

15. A program storage device readable by a computer, tangibly embodying a program of instructions executable by the computer to perform the method steps for detecting ground glass objects in a digitized medical image, said method comprising the steps of:

providing a digitized medical image comprising a plurality of intensities corresponding to a domain of points on an N-dimensional grid;

determining intensity statistics from a plurality of ground glass objects;

determining an intensity map of the distance of each point in said image from a mean intensity of said ground glass objects wherein one or more candidate ground glass objects can be identified;

determining a circularity value for each candidate ground glass object; and calculating one or more feature values wherein said candidate ground glass object is characterized.

16. The computer readable program storage device of claim 15, wherein determining an intensity map for each point comprises:

dividing a range of intensities into intervals;

assigning each point in said image to an intensity interval;

determining a weighted intensity for each point based on the intensities of its nearest neighbors; and calculating a function of the difference of each point intensity and the mean ground glass object intensity, wherein a contiguous collection of points are identified as being part of a candidate ground glass object.

17. The computer readable program storage device of claim 16, wherein said function is $$y = \kappa \cdot e^{-(\frac{\mu-v}{\sigma})^2},$$

where v is the weighted neighborhood intensity of the current point, k an arbitrary normalization constant, and μ and σ are, respectively, the mean intensity value and standard deviation of the ground glass objects.

18. The computer readable program storage device of claim 16, wherein the weighted intensity for each point is calculated from the formula (Sum(neighborhood point intensities)+w %(point intensity))/(9+w), where w is a predetermined weighting factor.

19. The computer readable program storage device of claim 15, wherein determining a circularity value comprises smoothing said candidate ground glass object based on mathematical morphology, and computing a ratio of the surface area of the candidate object to the area of a circle of a same radius.

20. The computer readable program storage device of claim 15, the method further comprising growing a region for each said candidate ground glass object and computing a gray-level co-occurrence matrix of each region.

21. The computer readable program storage device of claim 20, wherein growing a region further comprises determining a seed point for each candidate object, determining a distance map of each point in the candidate ground glass object to the background, applying a threshold to the distance map wherein points whose distance map exceeds the threshold are excluded from said region, and dilating said region.

22. The computer readable program storage device of claim 20, wherein the N-dimensional grid is a 2D rectangular lattice, and said co-occurrence matrix is calculated for point pairs at angular orientations of 0°, 45°, 90°, and 135°.

23. The computer readable program storage device of claim 22, wherein said co-occurrence matrix frequencies are sets defined by:

$$P(i, j, d, 0°) = \#\left\{\begin{array}{l}((k, l), (m, n)) \in (L_r \times L_c) \mid \\ k - m = 0, |l - n| = 0, I(k, l) = i, I(m, n) = j\end{array}\right\},$$

$$P(i, j, d, 45°) = \#\left\{\begin{array}{l}((k, l), (m, n)) \in (L_r \times L_c) \mid \\ (k - m = d, l-n = -d) \text{ or } (k - m = -d, l - n = d), I(k, l) = i, I(m, n) = j\end{array}\right\},$$

$$P(i, j, d, 90°) = \#\left\{\begin{array}{l}((k, l), (m, n)) \in (L_r - L_c) \mid \\ |k - m| = d, l - n = 0, I(k, l) = i, I(m, n) = j\end{array}\right\},$$

$$P(i, j, d, 135°) = \#\left\{\begin{array}{l}((k, l), (m, n)) \in (L_r \times L_c) \mid \\ (k - m = d, l - n = d) \text{ or } (k - m = -d, l - n = -d), I(k, l) = i, I(m, n) = j\end{array}\right\},$$

where d is a distance between point pairs, $L_c$ is the horizontal spatial domain, $L_r$ is the vertical spatial domain, and I is an intensity function defined on point pairs in the image domain set $L_r \% L_c$.

24. The computer readable program storage device of claim 23, wherein the distance d is two points apart.

25. The computer readable program storage device of claim 15, wherein said features comprise the mean, variance, skewness, kurtosis, energy, entropy, homogeneity, and contrast.

* * * * *